US012567232B2

(12) United States Patent
Nguyen et al.

(10) Patent No.: US 12,567,232 B2
(45) Date of Patent: Mar. 3, 2026

(54) CERTIFICATION-BASED ROBUST TRAINING BY REFINING DECISION BOUNDARY

(71) Applicants: INTERNATIONAL BUSINESS MACHINES CORPORATION, Armonk, NY (US); MASSACHUSETTS INSTITUTE OF TECHNOLOGY, Cambridge, MA (US)

(72) Inventors: Lam Minh Nguyen, Ossining, NY (US); Wang Zhang, Cambridge, MA (US); Subhro Das, Cambridge, MA (US); Pin-Yu Chen, White Plains, NY (US); Alexandre Megretski, Acton, MA (US); Luca Daniel, Cambridge, MA (US)

(73) Assignees: INTERNATIONAL BUSINESS MACHINES CORPORATION, Armonk, NY (US); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 652 days.

(21) Appl. No.: 17/933,473

(22) Filed: Sep. 19, 2022

(65) Prior Publication Data

US 2024/0096057 A1     Mar. 21, 2024

(51) Int. Cl.
*G06K 9/62*          (2022.01)
*G06V 10/764*        (2022.01)
*G06V 10/774*        (2022.01)

(52) U.S. Cl.
CPC .......... *G06V 10/764* (2022.01); *G06V 10/774* (2022.01)

(58) Field of Classification Search
CPC ..... G06V 10/764; G06V 10/774; G06V 10/82
See application file for complete search history.

(56) References Cited

U.S. PATENT DOCUMENTS 10,025,950 B1 *   7/2018   Avasarala ......... G06F 18/23213
11,449,063 B1 *   9/2022   Ebrahimi Afrouzi ......................
                                              G05D 1/0246
(Continued)

FOREIGN PATENT DOCUMENTS

CN        112951214 B        4/2022
CN        111881439 B        5/2022

OTHER PUBLICATIONS

Cheng, M. et al., "CAT: Customized Adversarial Training for Improved Robustness."; arXiv:2002.06789 (2020); 11 pgs.
(Continued)

*Primary Examiner* — Xin Jia
(74) *Attorney, Agent, or Firm* — CHIP LAW GROUP

(57) ABSTRACT
A computer implemented method for certifying robustness of image classification in a neural network is provided. The method includes initializing a neural network model. The neural network model includes a problem space and a decision boundary. A processor receives a data set of images, image labels, and a perturbation schedule. Images are drawn from the data set in the problem space. A distance from the decision boundary is determined for the images in the problem space. A re-weighting value is applied to the images. A modified perturbation magnitude is applied to the images. A total loss function for the images in the problem space is determined using the re-weighting value. A confidence level of the classification of the images in the data set is evaluated for certifiable robustness.

20 Claims, 10 Drawing Sheets

100

(56)                    References Cited

U.S. PATENT DOCUMENTS

| | | | |
|---|---|---|---|
| 11,481,918 B1 * | 10/2022 | Ebrahimi Afrouzi ........................ | |
| | | | A47L 11/4008 |
| 2019/0220605 A1 | 7/2019 | Kounavis et al. | |
| 2019/0220755 A1 | 7/2019 | Carbune et al. | |
| 2021/0081793 A1 | 3/2021 | Chen et al. | |
| 2021/0117771 A1 | 4/2021 | Chen et al. | |
| 2021/0326745 A1 | 10/2021 | Chen et al. | |
| 2021/0334646 A1 | 10/2021 | Liu et al. | |
| 2022/0051057 A1 * | 2/2022 | Kounev ................ G06V 10/82 | |

OTHER PUBLICATIONS

Zhang, H. et al., "Towards stable and efficient training of verifiably robust neural networks", ICLR (2020); 25 pgs.

Zhang, H. et al., "Efficient Neural Network Robustness Certification with General Activation Functions"; 32nd Conference on Neural Information Processing Systems (NIPS 2018); 17 pgs.

Zeng, H. et al., "Are Adversarial Examples Created Equal? A Learnable Weighted Minimax Risk For Robustness Under Non-Uniform Attacks"; arXiv:2010.12989 (2020); 30 pgs.

Zhang, J. et al., "Geometry-Aware Instance-Reweighted Adversarial Training"; arXiv:2010.01736 (2021); 29 pgs.

Mell, P. et al., "Recommendations of the National Institute of Standards and Technology"; NIST Special Publication 800-145 (2011); 7 pgs.

* cited by examiner

100

CLOUD

120

MODEL TRAINING ENGINE
110

NEURAL NETWORK SERVER

116

TRAINING DATA SOURCE

112

113

NETWORK

106

103(1)

102(1)

103(N)

102(N)

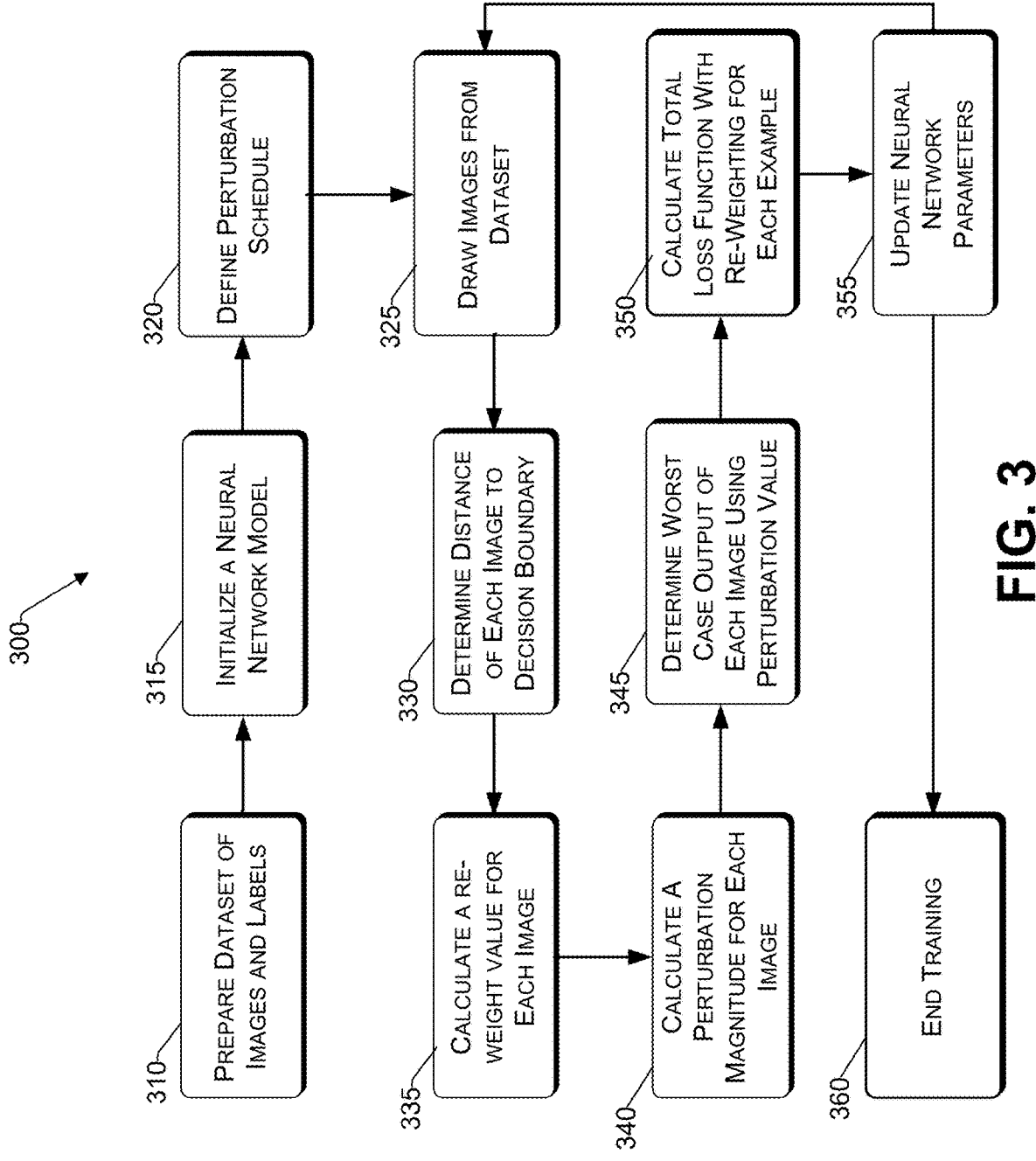

300

310 — PREPARE DATASET OF IMAGES AND LABELS

315 — INITIALIZE A NEURAL NETWORK MODEL

320 — DEFINE PERTURBATION SCHEDULE

325 — DRAW IMAGES FROM DATASET

330 — DETERMINE DISTANCE OF EACH IMAGE TO DECISION BOUNDARY

335 — CALCULATE A RE-WEIGHT VALUE FOR EACH IMAGE

340 — CALCULATE A PERTURBATION MAGNITUDE FOR EACH IMAGE

345 — DETERMINE WORST CASE OUTPUT OF EACH IMAGE USING PERTURBATION VALUE

350 — CALCULATE TOTAL LOSS FUNCTION WITH RE-WEIGHTING FOR EACH EXAMPLE

355 — UPDATE NEURAL NETWORK PARAMETERS

360 — END TRAINING

FIG. 3

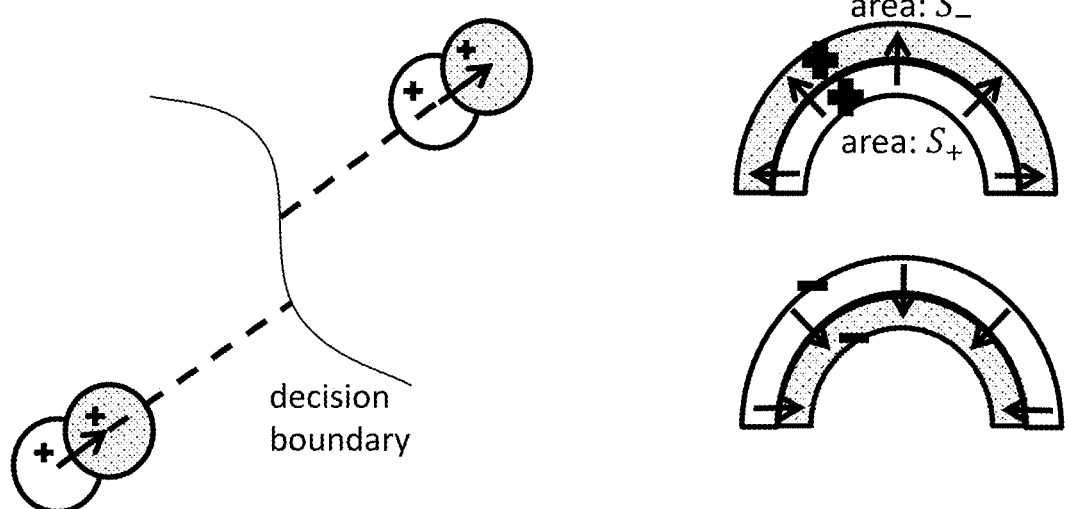
decision
boundary
FIG. 4A                    FIG. 4B

Figure 5B:
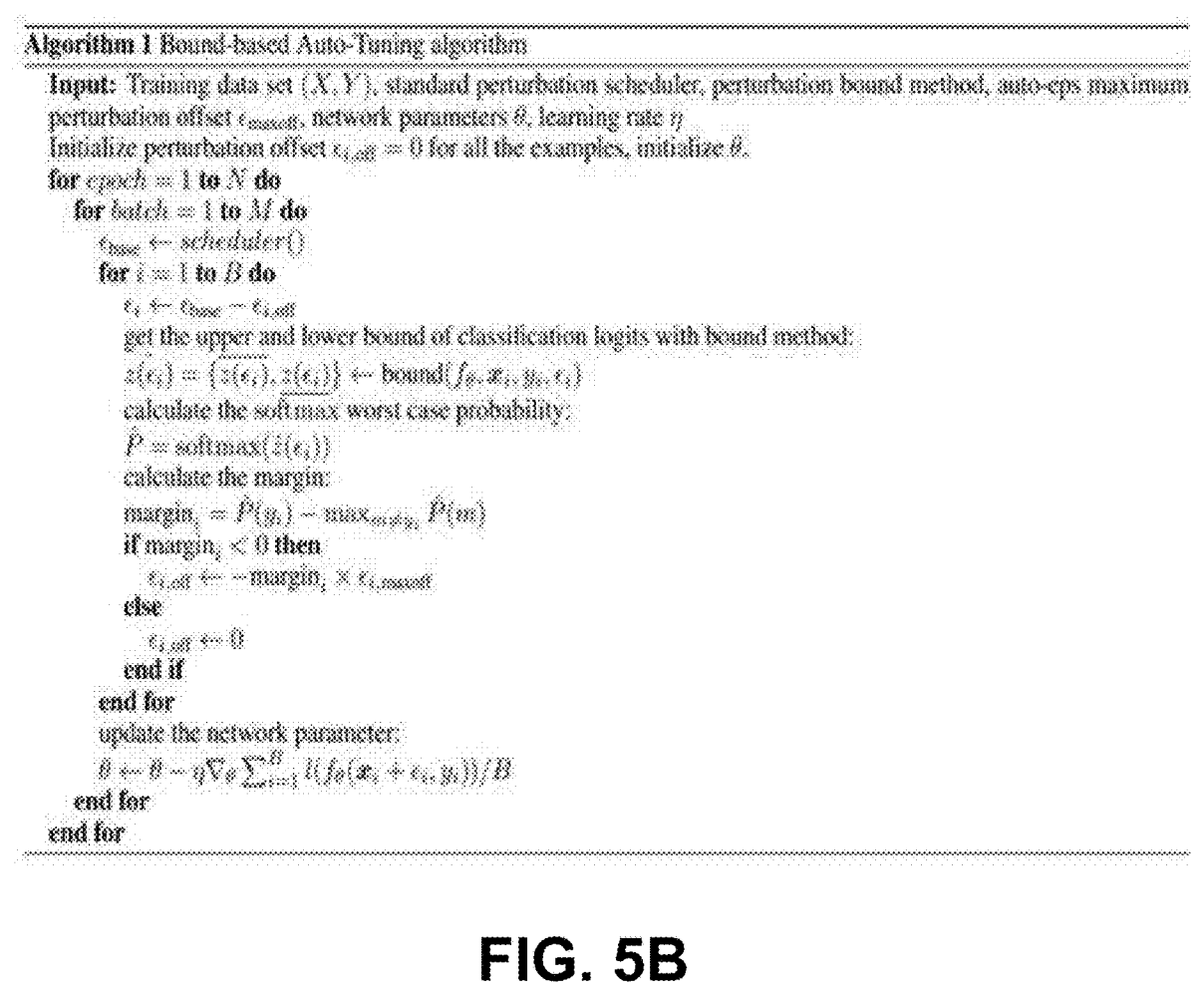

Algorithm 1 Bound-based Auto-Tuning algorithm

Input: Training data set $(X, Y)$, standard perturbation scheduler, perturbation bound method, auto-eps maximum perturbation offset $c_{max,off}$, network parameters $\theta$, learning rate $\eta$ Initialize perturbation offset $c_{i,off} = 0$ for all the examples, initialize $\theta$.

for $epoch = 1$ to $N$ do for $batch = 1$ to $M$ do

$c_{base} \leftarrow scheduler()$ for $i = 1$ to $B$ do

$c_i \leftarrow c_{base} - c_{i,off}$ get the upper and lower bound of classification logits with bound method:

$z(c_i) = \{\overline{z(c_i)}, \underline{z(c_i)}\} \leftarrow bound(f_\theta, x_i, y_i, c_i)$ calculate the softmax worst case probability:

$\hat{P} = softmax(\tilde{z}(c_i))$ calculate the margin:

$margin_i = \hat{P}(y_i) - \max_{m \neq y_i} \hat{P}(m)$ if $margin_i < 0$ then

$c_{i,off} \leftarrow -margin_i \times c_{i,max,off}$ else

$c_{i,off} \leftarrow 0$ end if end for update the network parameter:

$\theta \leftarrow \theta - \eta \nabla_\theta \sum_{i=1}^{B} l(f_\theta(x_i + c_i, y_i))/B$ end for end for

CERTIFICATION-BASED ROBUST TRAINING BY REFINING DECISION BOUNDARY

BACKGROUND

Technical Field

The present disclosure generally relates to neural networks, and more particularly, to a method for improving certification-based robust training by refining decision boundary.

Description of the Related Art

Deep neural networks (DNNs) have been shown to be highly vulnerable to adversarial attacks, which are carefully crafted inputs that are nearly indistinguishable from naturally occurring data and result in misclassified data by the network. There exist many algorithms for both crafting adversarial attacks and building neural networks that are robust against such attacks. The fast gradient sign method (FGSM) was the very first approach to generate strong adversary data. The projected gradient descent (PGD) is one of the most successful and widely-used defense methods to adversarial data available.

Adversarial training of a neural network seeks to minimize the worst-case loss under adversarial perturbations within a pre-defined perturbation level. Multi-step PGD is used to estimate the worst-case attack during training. Compared to standard training, the adversarial term introduces risk of over-fitting and training instability for adversarial training. There exist many related works on improving the model performance by additional regulation and customizing training curriculum for an attack-based scenario. While adversarial training has been shown to be empirically effective against many types of attacks, the resultant models from adversarial training cannot be proven to be robust against all adversaries. It has been shown that many defense methods dependent on heuristic techniques, including adversarial training, can be bypassed by stronger adversaries.

SUMMARY

According to an embodiment of the present disclosure, a computer implemented method for certifying robustness of image classification in a neural network is provided. The method includes initializing a neural network model in the neural network. The neural network model includes a problem space and a decision boundary in the problem space. A processor receives a data set of images and image labels. A user input perturbation schedule is applied to the data set of images and image labels. Images from the data set are drawn in the problem space using the user input perturbation schedule. A distance from the decision boundary is determined for the images in the problem space. A re-weighting value is applied to the images in the problem space. The re-weighting value affects the distance to the decision boundary for at least some of the images in the problem space. A total loss function is determined for the images in the problem space using the re-weighting value. A modified perturbation magnitude is applied to the images in the problem space. Positions of the images in the problem space relative to the decision boundary line are determined using the modified perturbation magnitude. A confidence level of a classification of the images in the data set is evaluated based on the total loss function and the positions of the images in the problem space relative to the decision boundary line, using the modified perturbation magnitude. The training of the neural network model is terminated after evaluated.

According to an embodiment of the present disclosure, a computer program product for certifying robustness of image classification in a neural network is provided. The computer program product includes one or more computer readable storage media, and program instructions collectively stored on the one or more computer readable storage media. The program instructions include initializing a neural network model in the neural network. The neural network model includes a problem space and a decision boundary in the problem space. A processor receives a data set of images and image labels. A user input perturbation schedule is applied to the data set of images and image labels. Images from the data set are drawn in the problem space using the user input perturbation schedule. A distance from the decision boundary is determined for the images in the problem space. A re-weighting value is applied to the images in the problem space. The re-weighting value affects the distance to the decision boundary for at least some of the images in the problem space. A total loss function is determined for the images in the problem space using the re-weighting value. A modified perturbation magnitude is applied to the images in the problem space. Positions of the images in the problem space relative to the decision boundary line are determined using the modified perturbation magnitude. A confidence level of a classification of the images in the data set is evaluated based on the total loss function and the positions of the images in the problem space relative to the decision boundary line, using the modified perturbation magnitude. The training of the neural network model is terminated after evaluated.

According to an embodiment of the present disclosure, a computer server for certifying robustness of image classification in a neural network is provided. The computer server includes: a network connection; one or more computer readable storage media; a processor coupled to the network connection and coupled to the one or more computer readable storage media; and a computer program product including program instructions collectively stored on the one or more computer readable storage media. The program instructions include initializing a neural network model in the neural network. The neural network model includes a problem space and a decision boundary in the problem space. The processor receives a data set of images and image labels. A user input perturbation schedule is applied to the data set of images and image labels. Images from the data set are drawn in the problem space using the user input perturbation schedule. A distance from the decision boundary is determined for the images in the problem space. A re-weighting value is applied to the images in the problem space. The re-weighting value affects the distance to the decision boundary for at least some of the images in the problem space. A total loss function is determined for the images in the problem space using the re-weighting value. A modified perturbation magnitude is applied to the images in the problem space. Positions of the images in the problem space relative to the decision boundary line are determined using the modified perturbation magnitude. A confidence level of a classification of the images in the data set is evaluated based on the total loss function and the positions of the images in the problem space relative to the decision boundary line, using the modified perturbation magnitude. The training of the neural network model is terminated after evaluated.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 3 is a flowchart of a method for certifying a robustness of a training model in a neural network according to an embodiment.

FIG. 4A and FIG. 4B are diagrammatic views showing a movement of adversarial data influenced data points from a decision boundary through re-weighting, consistent with embodiments.

FIG. 5B is a screenshot of a bound-based auto-tuning algorithm, consistent with embodiments.

DETAILED DESCRIPTION

Overview

Figure 1:
FIG. 1 is a block diagram of an architecture for training a neural network according to an embodiment.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present disclosure generally relates to systems and methods for certifying robustness of a training model in a neural network. There is a branch of research focused on robustness certification/verification: computing provable guarantees on the robustness performance of neural networks against inputs with arbitrary perturbations within some 1p norm-bounded ball. There are two main types of verification methods: complete and incomplete verification. The former computes exact robustness bounds using computationally expensive methods such as mixed-integer programming (MIP), whereas the latter provides looser robustness bounds with different branches of methods including randomized smoothing, Lipschitz-based robustness and convex adversarial polytype. A sparsely related branch of research, called certified robust training, aims to train a certifiably robust model. These methods compute verified robustness bounds and incorporate them into the training process, such that the resultant models can then be proven to be robust using a verification method.

Currently, one of the most efficient certified training methods is interval bound propagation (IBP), which requires only two additional forward passes during training. In standard certified training, a uniform E and loss function weight are usually used across all the training examples, this is not ideal for optimal verified accuracy since the examples are not necessarily equivalent in terms of vulnerability.

The following are general areas of techniques used in the adversarial defense/attack realm related to neural network modelling.

Certified Training Techniques

Robustness Verification. Different from attack-based training, certified training provides a guarantee for a worst case scenario via bounding the neural network outputs. The certified accuracy is the lower bound of robustness accuracy under any attack method, thus improving the certified accuracy helps in understanding the potential of the neural network in defending against adversarial attacks.

Interval Bound Propagation (IBP). There have been many proposed neural network verification algorithms that can be used to compute worst case output. IBP utilizes an interval arithmetic approach to propagate bounds through a network. Let $\vz_{k-1}$ denote the input to a layer $\vz_k$. IBP bounds $\vz_k$ by computing lower and upper bounds $\underline{\vz}_k, \overline{\vz}_k$ such that $\underline{\vz}_k \leq k \leq \overline{\vz}_k$ holds elementwise. For affine layers represented by $h k(\vz_{k-1})=W_{k-1}+b$, IBP computes: $\underline{\vz}_k=\mW \frac{\overline{\vz}{k-1}+\underline{\vz}{k-1}}{2}-\mW|\frac{\overline{\vz}_{k-1}-\underline{\vz}{k-1}}{2}+b$ and $\overline{\vz}_k=\mW \frac{\overline{\vz}_{k-1}+\underline{\vz}_{k-1}}{2}+1\mW|\frac{\overline{\vz}_{-1}-\underline{\vz}_{k-1}}{2}+b$. Propagating the bounds through the network allows us to compute the upper and lower bound of last layer logits $\overline{\vz}_{K},\underline{\vz}_{K}$ and evaluate if an input $\vx$ is verifiably robust. The logit of the true class equals the lower bound and the logits of other classes equal to the upper bound:

$$\label{eqn: zk} \hat{\vz}_{K,m}=\begin{cases} \textcolor{red}{\underline{\vz}_{K,m}} &\text{if $m$ is the true class} \\ \textcolor{red}{\overline{\vz}{K,m}} &\text{otherwise} \end{cases}$$

IBP training uses a hyperparameter schedule on ∈ (starting from 0 and increasing to $\epsilon_{train}$, typically set at $\epsilon_{train}$ which is slightly larger than $\epsilon_{eval}$) and a mixed loss function that combines natural and robust cross-entropy loss: $\min_{\theta} \displaystyle E_{(\vx, y) \sim \mathcal{P}}[\kappa 1(\vz_K,y)+(1-\kappa) 1(\hat{\vz} K,y)]$, where $\mathcal{P}$ is the data distribution, 1 is the cross entropy loss, κ is a hyperparameter that balances the weight between natural and robust loss, and $\hat{\vz}_K$ represents the worst case logits computed using IBP.

CROWN-IBP. CROWN achieves a tight bound by adaptively selecting the linear approximation. CROWN-IBP trained models have a tighter bound compared with IBP models under the IBP metric, with incurring cost on computational efficiency from CROWN backward propagation and generally requiring more epochs for training stability.

Attack-Based Re-Weighting

Motivated by the idea that all data points are not equally vulnerable to adversarial attack, researchers proposed methods to re-weight the minimax risk by adding a re-weighting term $\omega(\vx_i, y_i)$ ahead of individual example loss. For instance, noted the adversarial distribution deviation from the clean examples and assigned weights that monotonically decreases with the examples' confidence margin. The "confidence margin" is calculated by attack methods such as PGD, then the risk is re-weighted by a parameterized exponential family as: $\mathop{\min}_{\theta} \frac{1}{n}\sum_{i=1}^n\omega(\vx_i,y_i) l(f_{\theta}(\vx_i'), y_i), \text{s.t.}\ \omega(\vx_i, y_i)=\text{exp} ({-\alpha \; \text{margin}} (f_\theta, \vx_i+\delta_i,y_i)})$, where α is a positive hyper-parameter and the new risk biases larger weights towards the mis-classified examples.

GAIRAT (Geometry-Aware Adversarial Training), a method to reweight adversarial examples based on how close they are to the decision boundary. During the training process, GAIRAT explicitly assigns larger/smaller weights to data points closer/farther to the decision boundary respectively: $\omega(\vx_i,y_i)=(1+\tan h(\lambda+5 \times(1-2\times\kappa(\vx_i,y_i)/K)/{2}$, where λ is a hyper-parameter, K is the maximal allowed attack iteration and κ is the least iteration number that the attack method requires to fool the classifier. Similar to re-weighting, improves clean image performance by prioritizing the robustness between the most dissimilar groups Customized Adversarial Training In most adversarial training methods, the adversarial attack strength usually follows a pre-defined scheduler throughout the training process. For instance, the perturbation E is a uniform number for all examples and usually gradually increases. The assumption may be problematic given the fact that adversarial examples are not equally vulnerable.

In the subject disclosure, embodiments propose incorporating two features to improve robustness in a training model by refining the validity of data points near a decision boundary. The embodiments disclosed herein are usable in verifiable adversarial training methods such as IBP and CROWN-IBP. As will be appreciated, the methods disclosed herein are generally applicable to all the verifiable adversarial training methods at almost no additional computational cost. The features improve the technology related to computer-based modeling by providing certifiable accuracy in the output of data. For example, objects being classified by a training model will be known to be classified accurately because any adversarial data added to a data set will be accounted for. In one aspect, the method can operate without even having to identify whether adversarial data is present. Thus, the method does not require any direct countermeasures for any particular adversarial attack.

Definitions

Certification or Certify: for a given input, the model guarantees that no perturbation exists that is above a predetermined threshold. For image x, perturbation bound $\epsilon$, perturbed image x', neural network M, "certification" of the neural network M on the specific image x under perturbation bound $\epsilon$ means that: for any x'=x+noise, if the noise magnitude is under $\epsilon$, then the neural network output of x' is confirmed to make the correct classification decision.

As will be seen below, in one embodiment, a certification method is used to find out the worst case output of perturbed x' under bound $\epsilon$ which is fed into a loss function. If the neural network makes the correct decision with worst case x', then x is "certified". For typical classification tasks, the neural network outputs the probability of each class and the category with the largest probability will be the prediction. In a certification method, the neural network output may be determined by calculating the upper and lower bound of the probability of a given $\epsilon$. In one example, the worst case output means the true class is given the lower bound and other classes are assumed the upper bound. This is the worst case scenario for making a "correct decision" given the $\epsilon$. If the neural network still makes the correct prediction in the worst case, it means all the scenarios between the bounds may be considered certified. In terms of the model performance metric of a dataset, being "certified" may mean, that a threshold percentage of the images within the dataset, under bound $\epsilon$, are verifiable.

Example Architecture

FIG. 1 illustrates an example architecture 100 for certifying robustness of a training model in a neural network. Architecture 100 includes a network 106 that allows various computing devices 102(1) to 102(N) to communicate with each other, as well as other elements that are connected to the network 106, such as training data source 112, a recommendation server 116, and the cloud 120.

The network 106 may be, without limitation, a local area network ("LAN"), a virtual private network ("VPN"), a cellular network, the Internet, or a combination thereof. For example, the network 106 may include a mobile network that is communicatively coupled to a private network, sometimes referred to as an intranet that provides various ancillary services, such as communication with various application stores, libraries, and the Internet. The network 106 allows model training engine 110 (sometimes referred to simply as the "training engine 110" or the "model engine 110"), which is a software program running on the neural network server 116, to communicate with the training data source 112, computing devices 102(1) to 102(N), and the cloud 120, to provide data processing. The training data source 112 may provide data objects 113 used for training a neural network model. In an exemplary embodiment, artificial intelligence is one technique used for processing the data to build predictive models. The resultant models may be certifiable for robustness of their output according to the embodiments described herein. In one embodiment, the data processing is performed at least in part on the cloud 120.

For purposes of later discussion, several user devices appear in the drawing, to represent some examples of the computing devices that may be the source of data being analyzed depending on the task chosen. Aspects of the symbolic sequence data (e.g., 103(1) and 103(N)) may be communicated over the network 106 with the model training engine 110 of the neural network server 116. Today, user devices typically take the form of portable handsets, smartphones, tablet computers, personal digital assistants (PDAs), and smart watches, although they may be implemented in other form factors, including consumer, and business electronic devices.

For example, a computing device (e.g., 102(N)) may send a query request 103(N) to the training engine 110 to identify subject matter related to a query. An example of a query application may be classification of a corpus of images.

While the training data source 112 and the training engine 110 are illustrated by way of example to be on different platforms, it will be understood that in various embodiments, the training data source 112 and the neural network server 116 may be combined. In other embodiments, these computing platforms may be implemented by virtual computing devices in the form of virtual machines or software containers that are hosted in a cloud 120, thereby providing an elastic architecture for processing and storage.

Example Methodology

In the following methods, flowcharts are shown to help describe the processes involved. The flowcharts may be shown as divided into sections showing which entity types may perform certain steps in a process. However, it should be understood, that while some examples show human users performing some steps, some embodiments may instead perform those user shown steps by a machine (for example, a computer processor or other automated device or in some embodiments, a software application). As will be appreciated, certain aspects of the subject technology are necessarily rooted in computer technology (e.g., must be performed by a particularly configured computing device) in order to overcome a problem specifically arising in the realm of computer related technology. For example, as will be seen below, some aspects use A.I. to model and train models that perform some function such as classification related to a query or other input request. Moreover, features are disclosed related to processing input data to certify the robustness (or accuracy of the output), which cannot be performed by manual human approaches because the data set generally involves amounts of data that a person or persons could not process in a lifetime, much less within a practical timeframe. In addition, it should be appreciated that the features discussed are related to defending against adversarial data attacks which subtly add a noise component to a data file to confuse a machine. The noise data may be indiscernible to a person viewing the data object and accordingly, any suggestion that the techniques disclosed herein may be manually performed would be impertinent to the context of the subject technology. In addition, some steps may be described as performed by "the system" which may be interpreted in some instances as being perform by a machine or computing device implementing executable instructions.

Figure 2:
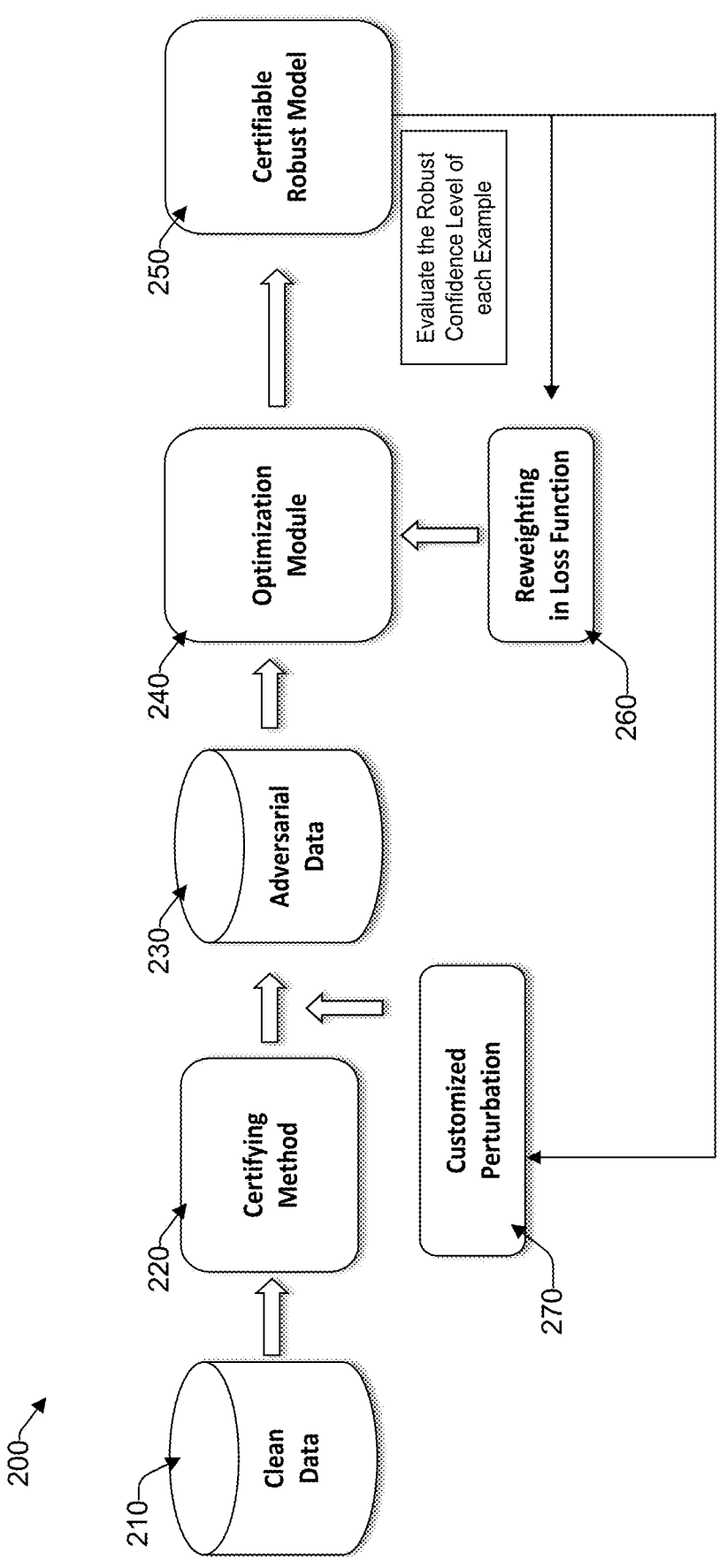
FIG. 2 is a flowchart of a system for certifying a robustness of a training model in a neural network according to some embodiments.

Referring now to FIG. 2, a system 200 for certifying a robustness of a training model in a neural network is shown. The system 200 includes a database 210 of input data. The database 210 may be analogous to the data source 112 of FIG. 1. The data in database 210 may be assumed to be clean data (for example, uncorrupted yet by an adversarial attack). The system 200 further includes the application of a certifying method 220. The certifying method 220 may be applied to the clean data by, for example, the model training engine 110 of FIG. 1. In some embodiments, a customized perturbation magnitude may be applied to the clean input data. As will be shown further below, customizing the perturbation magnitude for individual data points will reduce the number of data points that improperly cross the decision boundary in a problem space. Application of the customized perturbation values may occur prior to any modelling and/or optimization of data or after an iteration of processing the data for the modelling task being performed.

The system 200 may assume that adversarial data 230 has been applied to the clean data. It will be understood that the adversarial data is not actually a part of the system 200, but is shown to provide an understanding of where the adversarial data may enter the training process. Moreover, it should be appreciated that the methods described below may be indifferent to whether adversarial data is actually present.

In some embodiments, an optimization module 240 is applied to the input data. The input data may be clean or may include adversarial data. The optimization module 240 may be configured to apply one or more re-weighting techniques 260 to the input data. In general, re-weighting of the input data will affect data points closer to the decision boundary by moving data with adversarial content away from the decision boundary, which will eliminate data that can be misclassified.

The output data from the optimization module 240 may be used by the model training engine 110 to train a model. The resultant output may be a certifiable robust model 250. In some embodiments, a confidence level of the certifiable robust model 250 may be evaluated. In some embodiments, the confidence level for each data point (example piece of data) may be evaluated to determine the certifiability of robustness in the model.

Referring now to FIG. 3, a method 300 for certifying a robustness of a training model in a neural network is shown. While not explicitly shown, it will be understood that the neural network model includes a problem space and a decision boundary in the problem space as is known in the art of neural network modelling. The method 300 generally begins by preparing 310 a data set of images and labels for the images. The data set may be for example, the data objects 113 of FIG. 1 and/or the clean input data shown in FIG. 2. The preparation step 310 may be performed by either a user or by automation via the training model engine 110 (FIG. 1). The training model engine 110 may initialize 315 a neural network model that will be used to perform a modelling task. A perturbation schedule may be defined 320. The perturbation scheduler defining the schedule may be an affiliate algorithm for training. In some embodiments, the schedule may be pre-defined. For example, $\epsilon$ used in the training step may be dependent on training progress (epochs), similar to the learning rate. The training model engine 110 may draw (select) 325 images from the data set. In some embodiments, a certain number of images may be randomly selected from the data set. The training model engine 110 may determine 330 a distance of each image's data point to the decision boundary.

In one embodiment, the training model engine 110 may optimize the position values of individual data points. For example, the training model engine 110 may re-weight 335 the value for each image in the problem space. An example showing details of a re-weighting approach are described below in the section on Optimization by re-weighting. In some embodiments, the training model engine 110 may calculate a perturbation magnitude for data points. In some embodiments, the perturbation magnitude may be customized for individual data points. An example approach to customizing perturbation is described below in the section labeled Auto-tuning E. The training model engine 110 may determine 345 a worst case output of each image using the customized perturbation value. A total loss function may be calculated 350 using the re-weighting values. The neural network parameters may be updated 355 using the newly calculated loss function. In some embodiments, the method 300 may iterate back to the step of drawing 325 images from the dataset. In some embodiments, a pre-defined maximum number of iterations (epochs) for training may be set. When the maximum number of iterations are reached, the training of the model may terminate 360.

Optimization By Re-weighting

In one embodiment, the training model engine 110 may use a bound-based weighted loss. In classical classification tasks, training minimizes the following loss function: $\displaystyle \mathbb{E}_{(\vx,y)\sim P}[l(f_\vtheta(\vx),y)]$ estimated by $\frac{1}{n}\sum_{i=1}^n[l(f_\vtheta(\vx_i),y_i)]$. For adversarial training, let $\vx'$ be the worst case input under verifiable adversary or perturbed example from attack, the adversarial examples $(\vx',y)\sim P'$, where P' is an unknown distribution dependent on the clean example distribution P, perturbation method and neural network parameters. In practice, the training objective is usually $\frac{1}{n}\_ \sum_{i=1}^n [l(f_\vtheta(\vx'_i),y_i]$ estimating $\E_{(\vx,y)\sim P}[l(f_\vtheta(\vx'),y)]$, while the true objective should be $\E_{(\vx',y)\sim P'}[l(f_\vtheta(\vx'), y)]$. There exists a discrepancy between the true distribution and empirical sampling method. To bridge this gap, embodiments of the subject technology introduce an importance weight $$s(f_{\vtheta}, \quad \vx_i',y_i):=\frac{P'(\vx'_i,y_i)}{P(\vx_i,y_i)}$$

s.t.

$$\begin{aligned} \begin{split} \frac{1}{n}\ \sum_{i=1}^n [l(f_\vtheta(\vx'_i),y_i)s(f_{\vtheta}, \vx_i',y_i] \& \ \approx \E_{(\vx,y)\sim P}[l(f_\vtheta(\vx'),y)\frac{P'(\vx', y)}{P(\vx,y)}] \\ \& \approx \E_{(\vx',y)\sim P}[l(f_\vtheta(\vx'),y)]\end{split}\end{aligned}$$

As further exploration, the importance weight may be analyzed:

$$\begin{aligned} \begin{split} \frac{P'(\vx'_i,y_i)}{P(\vx_i,y_i)} \quad \&=\frac{P'(\vx'_i|y_i)P'(y_i)}{P(\vx_i|y_i)P(y_i)}=\frac{P'(\vx'_i|y_i)}{P(\vx_i)} \end{split} \ end {aligned} $$

where the first equality follows from the definition of conditional probability and second equality is from the fact that the label y_i and its distribution does not change through the adversarial process.

The probability ratio gives more insight in designing the parametric function for importance weight. Given label y_i, there exists a distribution of its corresponding clean image space $P(\vx|y_i)$ and similarly for worst case input space $P'(\vx'|y_i)$. If the distribution of its corresponding worst case $\vx'_i$ gets more concentrated compared to clean image distribution $P(\vx|y_i)$, then more weight should be given to this example and vice versa.

Theorem 1: Given a binary classification task $\mathbb{R}^n \xrightarrow[ ]{ } \{ \} \{+,-\}$ with equal prior probability, assume the corresponding examples $\vx_{+}$ and $\vx_{-}$ are uniformly distributed in region $\sS_+, \sS_{-} \subset \mathbb{R}^n, \sS+\cap \sS_{-}=\emptyset$. If there exists a bijection mapping $m \coloneqq \sS_+\mapsto \sS_{-}, \sS_-\mapsto \sS_{+}$ s.t. the post-mapping example $\vx_+'$ and $\vx_-'$ distribution remains uniform in each region, the expectation of conditional distribution ratio $\frac{P'(\vx'|y)}{P(\vx|y)}$ over original distribution $P(\vx, y)$ is great or equal than 1.

FIGS. 4A and 4B show two extreme cases of an adversarial example $\vx'$ distribution movement from clean $\vx$ distribution given decision boundary in a simplified 2D scenario. FIG. 4A shows an example distribution movement far away from a decision boundary. FIG. 4B shows an example distribution movement close to a decision boundary.

When $\vx$ is far away from decision boundary (FIG. 4A), the direction of attack or movement towards worst case example under verifiable adversary is the same for all the $\vx$. In this case, $\frac{P'(\vx'|y)}{P(\vx|y)} \approx 1$. In the second scenario (FIG. 4B), assume the decision boundary is a perfect semicircle representing the local curvature of decision boundary and perturbed examples from both classes follow a uniform distribution. Then the examples showing a negative sign ("−") label in the outer arc are condensed into the inner arc and vice versa for examples with the positive sign ("+") label moving to the external arc. Due to the existence of curvature, the area of the outer arc S_− is greater than the inner arc S_+. Therefore, from Theorem 1, the expectation of $\frac{P'(\vx'|y)}{P(\vx|y)}$ is greater than 1.

Deducing from the analysis of the two extreme cases, the importance weight around a decision boundary should be larger due to the local curvature, since any arbitrary $\vx'$ and $\vx$ distribution pairs (local curvature is relatively larger than perturbation distance but its effect is not negligible on post adversarial distribution) can be seen as an intermediate case of two extremes. Accordingly, methods of the subject technology may use a parametric weight function emphasizing the examples around the decision boundary in a symmetrical manner.

The margin of classifier $f$ may be defined for a data point $(\vx,y)$ as the probability difference between correct label and the most confident label among others. Specially, a bound-based method may be used such as IBP to get the margin under perturbation: $\hat{P}=\text{softmax} (\hat{\vz}_{K})$, where $\hat{\vz}_{K}S$ is the worst case logits as defined in [eqn: zk], P^ is the probability distribution calculated by softmax function given $\hat{\vz}_{K}$.

$$\text{margin}(f, \quad \vx, \quad y)=\hat{P}(f(\vx)=y)-\max_{m \neq y} \hat{P}(f(\vx)=m)$$

Figure 5A:
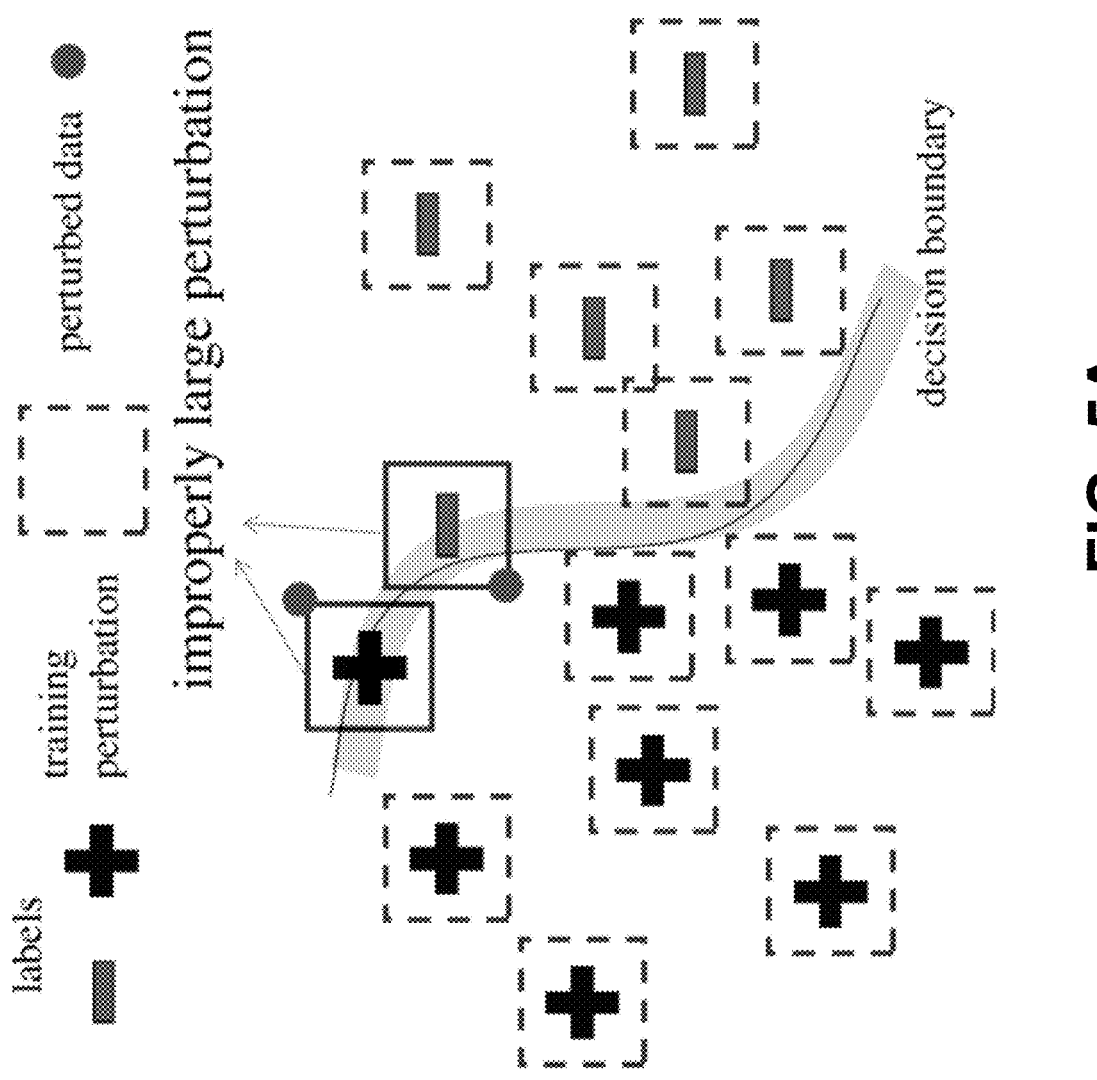
FIG. 5A is a diagrammatic view showing an effect of perturbation of data points near a decision boundary, consistent with embodiments.

The margin is positive when the example can be certified robust, otherwise the margin is negative. The magnitude of margin heuristically indicates the "distance" of the example towards the current decision boundary. FIG. 5A shows an implementation of the subject methods of re-weighting against vulnerability of examples, where the size of the labels indicates the weights and corresponding perturbations on clean data points. In one embodiment, the method 300 includes auto-tuning E. In an auto-tuning embodiment, the perturbation magnitude applied to data closer to a decision boundary may be customized. Customization is described in more detail below in the section about auto-tuning E. The algorithm shown in FIG. 5B provides an example of how customization may be modified after each iteration.

The most vulnerable examples are around the decision boundary, since the worst case scenario of a small perturbation could cross the decision boundary and fool the classifier. For the perturbed data points with smaller margin absolute value (closer to boundary), despite it being correctly classified, larger weights may be assigned to help the model focus on these data points and accommodate more slightly mis-classified data. For the data points farther from decision boundary, if a data point is mis-classified (for example, has a large negative margin), there is no need to assign a large weight since the model capacity is limited. For correctly classified data, small weights may be assigned because they are less related to the decision boundary.

The importance weight may be parametrized in the following form:

$$\omega_i=e^{-\gamma*(|\text{margin}(f_{\vtheta}, \vx_i',y_i,\epsilon)|)}+\alpha \sim s(f_{\vtheta}, \vx_i',y_i)$$

where $\gamma$ and $\alpha$ are both positive hyper-parameters to balance the effect of re-weighting. The full loss function after re-weighting is then defined as:

$$\label {eqn: reweight loss} % \mathop{E}_{(x, y) \in \mathcal{D}}[\kappa l(z_K,y)+(1-\kappa) l(\hat{z}_K,y)] \ kappa\frac {1}{n}\sum_{i=1}^n l(\vz_K,y)+(1-\kappa)\ frac{1}{\sum \omega_i} \sum_{i=1}^n \omega_i l(\hat{\vz} K,y)$$

where $\kappa$ is a hyper-parameter to balance the trade-off between clean loss and re-weighted robustness loss.

Auto-Tuning $\epsilon$

In certified training, the training perturbation magnitude $\epsilon_{train}$ is usually larger than the $\epsilon_{eval}$ for optimal test accuracy. As Table 1 shows the robustness error against different $\epsilon_{train}$ and $\epsilon_{eval}$, the optimal testing accuracy for $\epsilon_{test}$=0.3, 0.35 were both achieved at $\epsilon_{train}$=0.4 while smaller Strain fails certifying larger $\epsilon_{test}$.

TABLE 1

| | | | | |
|---|---|---|---|---|
| IBP certified robust error on MNIST data | | | | |
| | $_{test}$ = 0.30 | $_{test}$ = 0.35 | $_{test}$ = 0.40 | $_{test}$ = 0.45 |
| $_{train}$ = 0.30 | 9.81% | 100% | 100% | 100% |
| $_{train}$ = 0.35 | 8.76% | 12.13% | 100% | 100% |
| $_{train}$ = 0.40 | 8.66% | 11.40% | 15.82% | 100% |
| $_{train}$ = 0.45 (training gets unstable) | 25.13% | 30.62% | 37.63% | 47.88% |

With slightly larger perturbation during training, the model is more capable to handle unseen data in the testing. This observation is empirical, however, due to the limitation of model capacity, it is difficult for the model to handle all the examples with very large perturbation. When $\epsilon_{train}$=0.45, the training instability between different random seeds becomes noticeable. As shown previously in FIG. 5, with large perturbation, for the vulnerable points around the decision boundary, the worst case prediction protrudes the ideal boundary with a large margin and it is sometimes impossible for the model to fit these points. Including these worst case scenarios in training encourages over-fitting and compromises the model's ability to find the right boundary.

Following the above discussion, it should be appreciated that by customizing perturbation, sometimes for each example in the training set, leads to more accurate and verifiable results. For the majority of points in the interior of the decision zone, encouraging a large perturbation for the model enforces a thick decision "gap" for robustness consideration. Ideally, the interior points may see large perturbations for optimal robustness and boundary points may have moderate perturbations to avoid over-fitting. In the following, an adaptive process to customize the perturbation for each example based on verified bound is described. An example algorithm for custom perturbation is shown in Algorithm 1 (See FIG. 5B).

Experimental Support

Datasets and Implementation

In experiments, the code provided for IBP and CROWN-IBP was used and leverage the same CNN architecture (DM-Large) and training scheduler on MNIST and CIFAR-10 datasets.

For MNIST IBP schedule, the neural network is trained for 100 epochs with a batch size of 100. The base scheduler of training $\epsilon$ starts from 0 after 3 warm-up epochs and linearly grows to desired maximum training $\epsilon$ with 17 ramp-up epochs, after which base E stays at the targeted level. The Adam optimizer learning rate is initialized at 0.001 and decays by 10 times after 25 and 42 epochs. With MNIST CROWN-IBP schedule, the model is trained for 200 epochs with a batch size of 256. The ramp-up stage starts from epoch 10 and ends at epoch 50.

For CIFAR-10 dataset, a total of 3200 epochs including 320 warm-up epochs is used for training with a batch size of 1024 and learning rate of 0.0005 following two 10× decay after epoch 2600 and 3040. As a standard treatment, random horizontal flip and crops are used as data augmentation.

Notice for CROWN-IBP implementation, we reduce the training batch size from 1024 to 256 due to memory constraint.

The hyper-parameter $\kappa$ defined in the equation used to calculate re-weight and total loss linearly decreases from 1 to 0.5 during ramp-up stage. A scheduler ($\kappa_{start}$=1, $\kappa_{end}$=0.5) achieves better clean accuracy than ($\kappa_{start}$=0, $\kappa_{end}$=0) and ($\kappa_{start}$=0, $\kappa_{end}$=0) by ending up with weight on natural cross entropy loss. All the experiments were performed on 3 random seeds for reproducibility.

The methods disclosed in this paper are generally applicable to any certifiable adversarial training method. In the next section, IBP is leveraged for illustrative examples followed by CROWN-IBP results.

Results

TABLE 2

| Robustness against different hyper-parameters with re-weighting with IBP | | | | | | |
|---|---|---|---|---|---|---|
| Dataset | $\epsilon_{eval}$ | $\epsilon_{train}$ | $\gamma$ | $\alpha$ | Clean err.(%) | Verified err.(%) |
| MNIST | 0.3 | 0.4 | baseline | | 2.28 ± 0.12 | 8.66 ± 0.05 |
| | | | 1 | 0.1 | 2.28 ± 0.13 | 8.68 ± 0.06 |
| | | | 5 | 0.1 | 2.30 ± 0.07 | 8.42 ± 0.07 |
| | | | 10 | 0.1 | 2.28 ± 0.05 | 8.61 ± 0.05 |
| CIFAR-10 | 8/255 | 8.8/255 | baseline | | 49.44 ± 0.49 | 72.26 ± 0.16 |
| | | | 1 | 0.1 | 49.06 ± 0.01 | 72.32 ± 0.03 |
| | | | 5 | 0.1 | 49.46 ± 0.27 | 71.44 ± 0.04 |
| | | | 10 | 0.1 | 50.11 ± 0.38 | 71.60 ± 0.11 |

Effects of Re-Weighting

In Table 2, the effect of hyper-parameters used for the re-weighting under IBP are shown, where a larger $\gamma$ indicates a stronger re-distribution of weight for examples and $\alpha$ is a small number to prevent weight vanish when |margin| is close to 1. The hyper-parameters are evaluated on CIFAR-10 at $\epsilon$=8/255 and MNIST at $\epsilon$=0.4. The optimal hyper-parameter turns out to be $\gamma$=5, $\alpha$=0.1 for both data sets. Re-weighting method gains 0.24% verified accuracy on MNIST and 0.82% on CIFAR-10.

Figure 6:
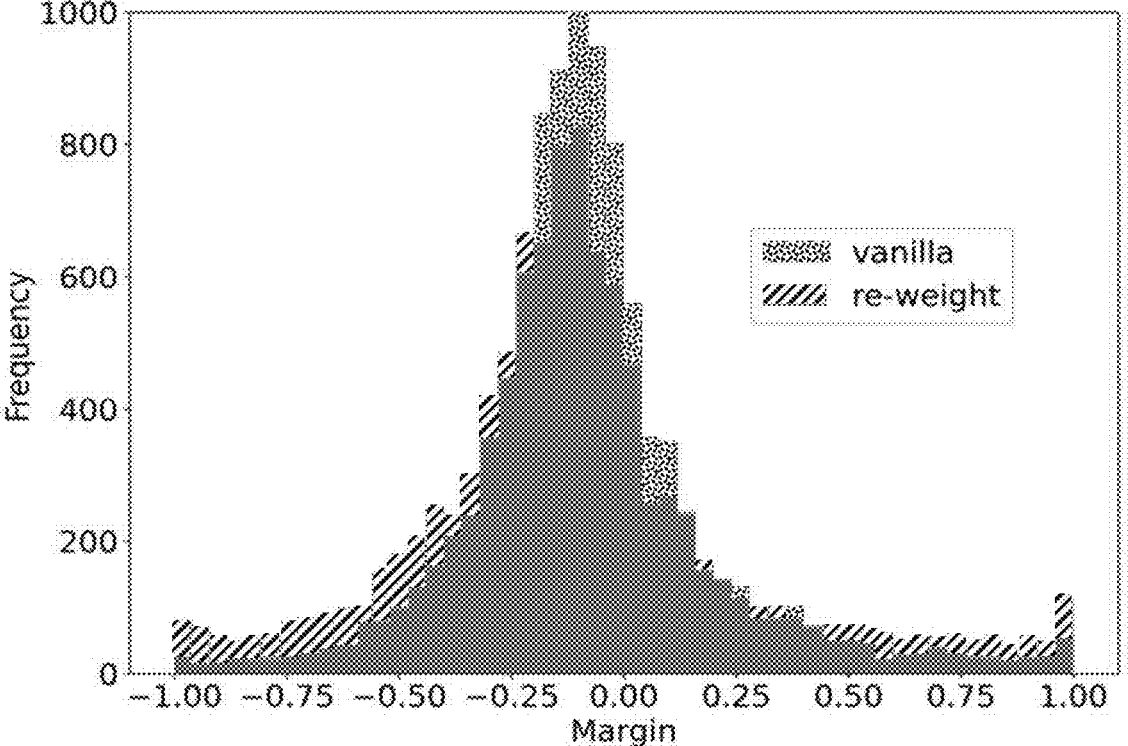
FIG. 6 is a plot showing conventional data results of verifiable accuracy compared to data points generated by the subject methodologies, consistent with embodiments.

The goal of re-weighting is to approximate the true adversarial distribution by sampling from clean data distribution. Unfortunately, it is difficult to visualize the intractable distribution. From another perspective, re-weighting may be interpreted as emphasizing on the robustness decision boundary and encouragement for larger margin. FIG. 6 shows the comparison of margin distribution for CIFAR-10 testing data set under testing $\epsilon$=8.8/255. Data representing the conventional model is depicted in a speckled pattern and is labeled "vanilla" in the legend. Data representing a re-weighted model is depicted in a striped pattern and labeled as "re-weight" in the legend. The darker solid fill area is an overlap of data from both types. With the conventional model, the example margins concentrate around the decision boundary. The re-weighting dilutes the example frequency to both sides, thus the classification results are less sensitive to perturbation change.

Effects of Auto-Tuning $\epsilon$

In robust training, a $\epsilon_{train}$ usually produces a good defensive model for $\epsilon_{eval}$ which is slightly smaller than itself. Practitioners may generally refrain from using an even larger E due to the marginal gain of robustness accuracy with the cost of sacrificing natural accuracy.

The idea of using auto-tuned $\epsilon$ is to prevent improperly large perturbation for vulnerable points around decision boundary. When $\epsilon_{train}$ is considerably larger than the testing E, the worst case points exceed the decision boundary by an unrecoverable large margin due to model capacity. The auto-tuning $\epsilon$ method in the embodiments disclosed above trims the unnecessary perturbation to alleviate the counter effect for robust training.

TABLE 3

| Robustness against different hyper-parameters with auto tuning $\epsilon$ with IBP | | | | | |
|---|---|---|---|---|---|
| Dataset | $\epsilon_{eval}$ | $\epsilon_{train}$ | $\epsilon_{maxoff}$ | Clean err.(%) | Verified err.(%) |
| MNIST | 0.3 | 0.4 | baseline | 2.28 ± 0.12 | 8.66 ± 0.05 |
| | | | 0.05 | 2.08 ± 0.08 | 8.52 ± 0.17 |
| | | | 0.1 | 2.04 ± 0.05 | 8.46 ± 0.23 |
| | | | 0.15 | 2.04 ± 0.10 | 8.36 ± 0.12 |
| | | | 0.2 | 2.17 ± 0.02 | 8.78 ± 0.06 |
| CIFAR-10 | 8/255 | 8.8/255 | baseline | 49.44 ± 0.49 | 72.26 ± 0.16 |
| | | | 0.005 | 49.17 ± 0.29 | 72.75 ± 0.53 |
| | | | 0.01 | 49.21 ± 0.74 | 73.23 ± 0.50 |
| | | | 0.015 | 49.21 ± 0.19 | 73.37 ± 0.27 |
| CIFAR-10 | 8/255 | 14/255 | baseline | 55.13 ± 0.73 | 70.50 ± 0.62 |
| | | | 0.005 | 55.78 ± 0.30 | 69.29 ± 0.58 |
| | | | 0.01 | 55.53 ± 0.88 | 69.44 ± 0.43 |
| | | | 0.015 | 56.62 ± 0.34 | 69.93 ± 0.64 |

Table 3 shows the hyper-parameters choice for auto-tuning $\epsilon$. For the MNIST data set, we found the optimal hyper-parameter $\epsilon_{maxoff}$ around 0.15 where the certified accuracy gains by 0.3% from baseline.

For the CIFAR data set, the standard $\epsilon_{train}$ 8.8/255 is only 10% larger than the $\epsilon_{eval}$. In this case, the auto-tuning $\epsilon$ method performs worse compared to the baseline results because the extra 10% is necessary for certified training. By using larger $\epsilon_{train}$, it is possible to reach even smaller testing error. To show the effect of auto-tuning E method, the $\epsilon_{train}$ may be increased until the testing verified accuracy stabilizes. For $\epsilon_{train}$=10/255, 14/255, 18/255, 22/255, a verified accuracy=70.62%±0.62%, 70.50%±0.62%, 70.31%±0.83%, 71.19%±0.21% of results, which are roughly 2% lower than the standard result. The selection of $\epsilon$=14/255 was chosen as the "sweet point", beyond which any increase in E does not appear to provide any improvement in accuracy because the very large perturbation is harmful to training. With the optimal $\epsilon_{maxoff}$=0.01, the verified accuracy is improved by 1.21% from baseline.

Coupling of Two Methods

By coupling two methods, the improvements may be further combined, and the improvements may achieve even better results. As shown in Table 3, for MNIST, using both optimal hyper-parameters from above individual tests a verified accuracy of 8.01% was reached, gaining 0.65% from the baseline. For CIFAR-10, the best results using the subject technology beats the IBP baseline by 2.17%.

Results on CROWN-IBP

To illustrate that the subject methods generally work for all the certifiable training, the same methods and optimal hyper-parameters are applied from an IBP setup directly to a CROWN-IBP. For MNIST data, the subject methods achieve 0.32% improvement from baseline by re-weighting and 0.13% from auto-eps; combining the two is similar to using auto-eps only though. For CIFAR data, a training batch size 256 was used instead of 1024 as used by other approaches. The standard $\epsilon_{train}$ 8.8/255 has verified error 68.10%±0.12% at $\epsilon_{eval}$=8/255 from the experiments using the subject methods. By elevating the bulk $\epsilon_{train}$ to 14/255, the verified error increases to 68.35%±0.43%. After applying the two methods, the results achieve 66.72%±0.7% accuracy and beat the baseline by 1.38%.

Example Computer Platform

Figure 7:
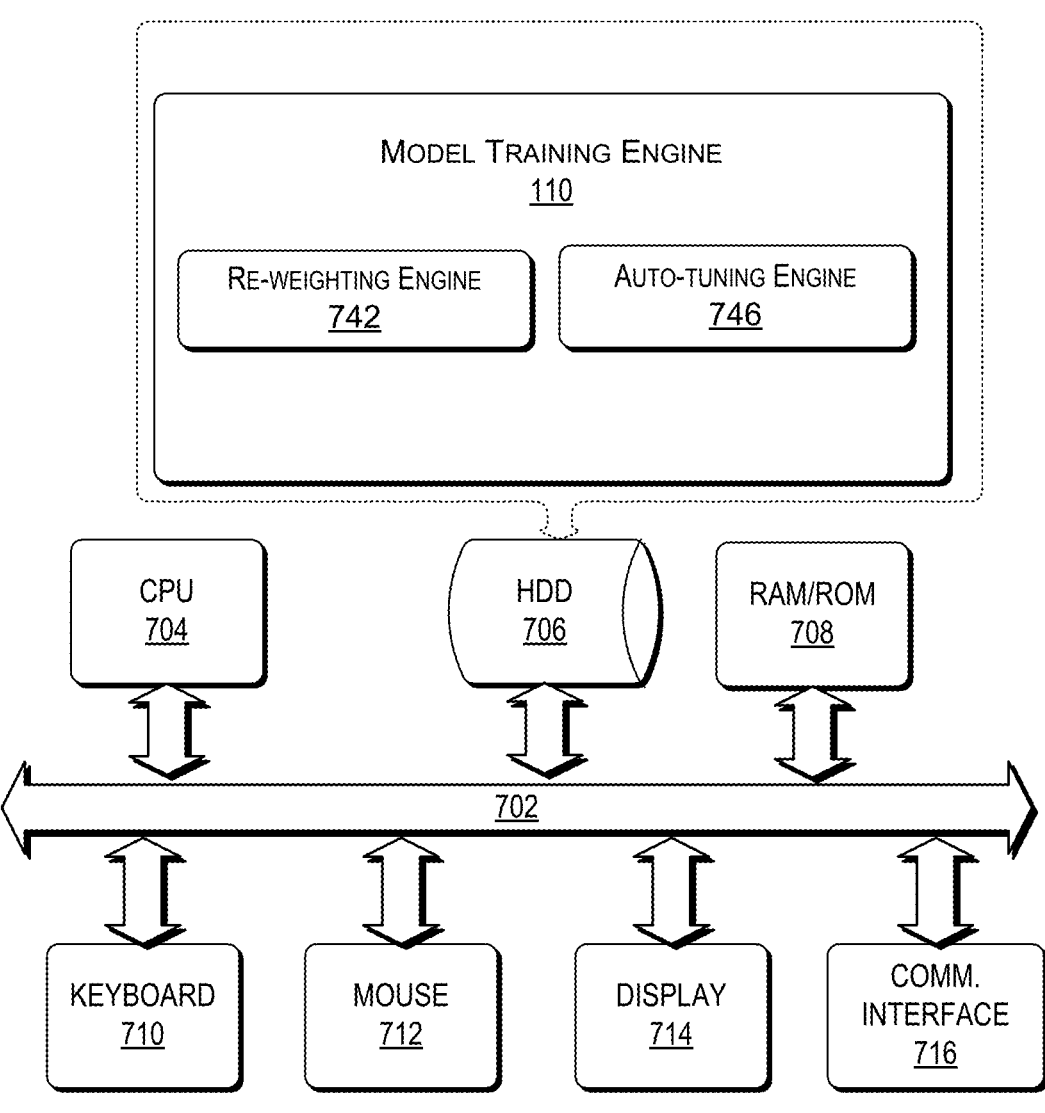
FIG. 7 is a functional block diagram illustration of a computer hardware platform that can communicate with various networked components.

As discussed above, functions relating to interpretable modeling of the subject disclosure can be performed with the use of one or more computing devices connected for data communication via wireless or wired communication, as shown in FIG. 1. FIG. 7 is a functional block diagram illustration of a computer hardware platform that can communicate with various networked components, such as a training input data source, the cloud, etc. In particular, FIG. 7 illustrates a network or host computer platform 700, as may be used to implement a server, such as the neural network server 116 of FIG. 1.

The computer platform 700 may include a central processing unit (CPU) 704, a hard disk drive (HDD) 706, random access memory (RAM) and/or read only memory (ROM) 708, a keyboard 710, a mouse 712, a display 714, and a communication interface 716, which are connected to a system bus 702.

In one embodiment, the HDD 706, has capabilities that include storing a program that can execute various processes, such as the model training engine 110, in a manner described herein. Generally, the model training engine 110 may be configured to process input data for training a neural network model with certifiable robustness under the embodiments described above. The model training engine 110 may have various software modules configured to perform different functions. In some embodiments, the model training engine 110 may include sub-modules. The sub-modules may include for example, a re-weighting engine 742 and an auto-tuning engine 746. The re-weighting engine 742 maybe configured to run the steps associated with re-weighting data points as described above. The auto-tuning engine 746 may be configured to run the steps for customizing perturbation magnitude for data points as describe above.

Example Cloud Platform

As discussed above, functions relating to analyzing the impact of a software upgrade on a computing device, may include a cloud 120 (see FIG. 1). It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
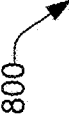
FIG. 8 depicts a cloud computing environment, consistent with an illustrative embodiment.

Referring now to FIG. 8, an illustrative cloud computing environment 800 is depicted. As shown, cloud computing environment 800 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
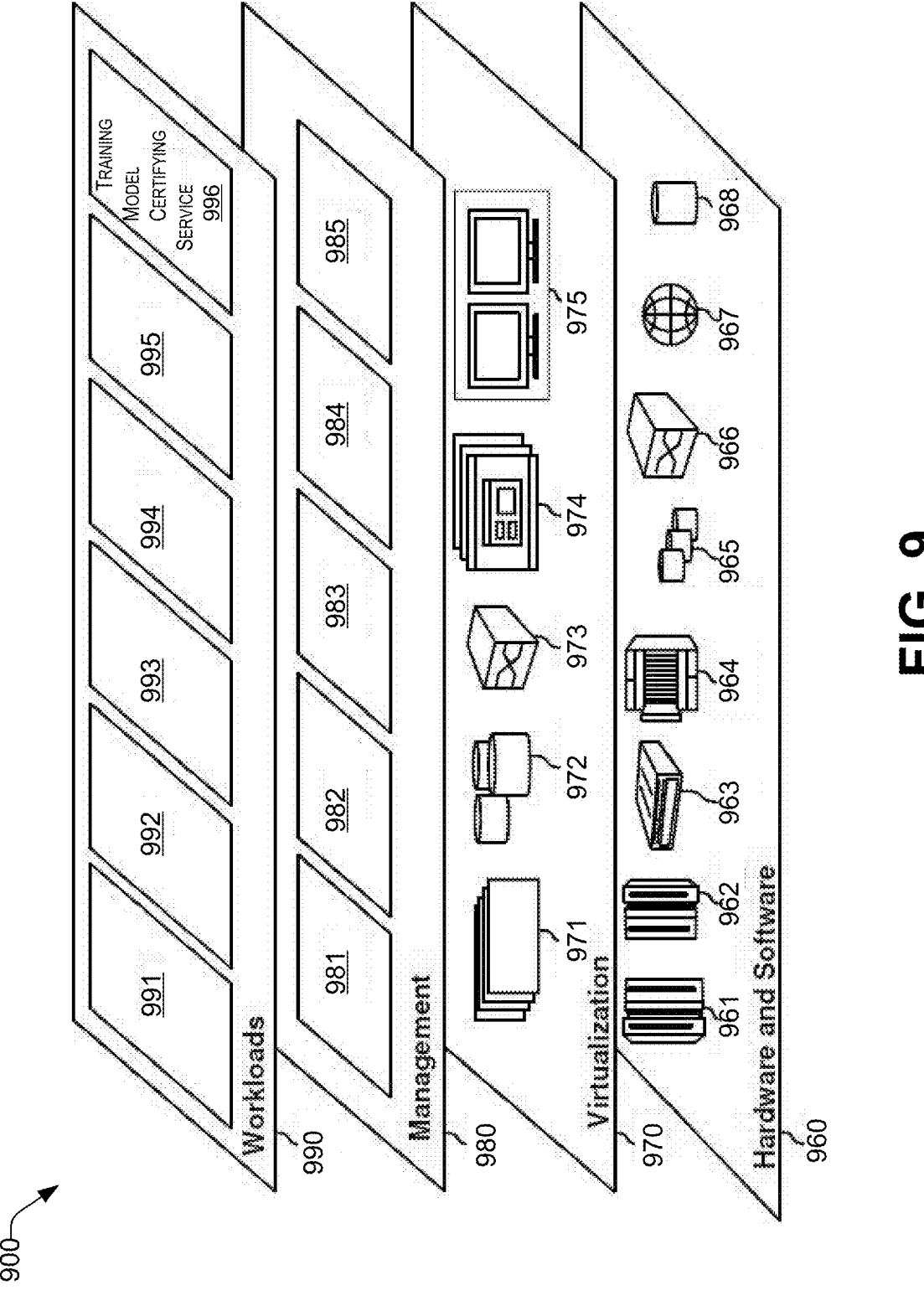
FIG. 9 depicts abstraction model layers, consistent with an illustrative embodiment.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the disclosure are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and training model certification of robustness service 996, as discussed herein.

Conclusion

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer implemented method for certifying robustness of image classification in a neural network, comprising:
    initializing a neural network model in the neural network, wherein the neural network model includes a problem space and a decision boundary in the problem space;
    receiving, by a processor, a data set of images and image labels;
    applying a user input perturbation schedule to the data set of images and image labels;
    drawing images from the data set in the problem space using the user input perturbation schedule;
    determining a distance from the decision boundary for the images in the problem space;
    applying a re-weighting value to the images in the problem space, wherein the re-weighting value affects the distance to the decision boundary for at least some of the images in the problem space;
    determining a total loss function for the images in the problem space using the re-weighting value;
    applying a modified perturbation magnitude to the images in the problem space;
    determining positions of the images in the problem space relative to the decision boundary, using the modified perturbation magnitude;
    evaluating a confidence level of a classification of the images in the data set based on the total loss function and the positions of the images in the problem space relative to the decision boundary, using the modified perturbation magnitude; and
    terminating training of the neural network model.

2. The method of claim 1, further comprising using a symmetrical re-weighting function to apply the re-weighting value to the images.

3. The method of claim 2, further comprising identifying worst case data points proximate the decision boundary, wherein the symmetrical weighting function is based on the distance from the decision boundary for the worst case data points.

4. The method of claim 1, further comprising customizing the modified perturbation magnitude to individual images in the problems space.

5. The method of claim 1, further comprising automatically tuning the modified perturbation magnitude to individual images in the problems space.

6. The method of claim 1, further comprising customizing the modified perturbation magnitude for individual images based on a confidence level of the distance of individual images to the decision boundary.

7. The method of claim 1, further comprising:
    determining a gradient descent direction from the total loss function; and
    updating neural network parameters using the gradient descent direction.

8. A non-transitory computer program product for certifying robustness of image classification in a neural network, the computer program product comprising:
    one or more computer readable storage media, and program instructions collectively stored on the one or more computer readable storage media, the program instructions comprising:
    initializing a neural network model in the neural network, wherein the neural network model includes a problem space and a decision boundary in the problem space;
    receiving, by a processor, a data set of images and image labels; applying a user input perturbation schedule to the data set of images and image labels; drawing images from the data set in the problem space using the user input perturbation schedule;
    determining a distance from the decision boundary for the images in the problem space;
    applying a re-weighting value to the images in the problem space, wherein the re-weighting value affects the distance to the decision boundary for at least some of the images in the problem space;
    determining a total loss function for the images in the problem space using the re-weighting value; applying a modified perturbation magnitude to the images in the problem space;
    determining positions of the images in the problem space relative to the decision boundary, using the modified perturbation magnitude;
    evaluating a confidence level of a classification of the images in the data set based on the total loss function and the positions of the images in the problem space relative to the decision boundary, using the modified perturbation magnitude; and
    terminating training of the neural network model.

9. The computer program product of claim 8, wherein the program instructions further comprise using a symmetrical re-weighting function to apply the re-weighting value to the images.

10. The computer program product of claim 9, wherein the program instructions further comprise identifying worst case data points proximate the decision boundary, wherein the symmetrical weighting function is based on the distance from the decision boundary for the worst case data points.

11. The computer program product of claim 8, wherein the program instructions further comprise customizing the modified perturbation magnitude to individual images in the problems space.

12. The computer program product of claim 8, wherein the program instructions further comprise automatically tuning the modified perturbation magnitude to individual images in the problems space.

13. The computer program product of claim 8, wherein the program instructions further comprise customizing the modified perturbation magnitude for individual images based on a confidence level of the distance of individual images to the decision boundary.

14. The computer program product of claim 8, wherein the program instructions further comprise:
    determining a gradient descent direction from the total loss function; and
    updating neural network parameters using the gradient descent direction.

15. A computer server configured to certify robustness of image classification in a neural network, comprising:

a network connection;

one or more computer readable storage media;

a processor coupled to the network connection and coupled to the one or more computer readable storage media; and a computer program product comprising program instructions collectively stored on the one or more computer readable storage media, the program instructions comprising:

initializing a neural network model in the neural network, wherein the neural network model includes a problem space and a decision boundary in the problem space;

receiving, by a processor, a data set of images and image labels;

applying a user input perturbation schedule to the data set of images and image labels;

drawing images from the data set in the problem space using the user input perturbation schedule;

determining a distance from the decision boundary for the images in the problem space;

applying a re-weighting value to the images in the problem space, wherein the re-weighting value affects the distance to the decision boundary for at least some of the images in the problem space;

determining a total loss function for the images in the problem space using the re-weighting value;

applying a modified perturbation magnitude to the images in the problem space;

determining positions of the images in the problem space relative to the decision boundary, using the modified perturbation magnitude;

evaluating a confidence level of a classification of the images in the data set based on the total loss function and the positions of the images in the problem space relative to the decision boundary, using the modified perturbation magnitude; and terminating training of the neural network model.

16. The computer server of claim 15, wherein the program instructions further comprise using a symmetrical re-weighting function to apply the re-weighting value to the images.

17. The computer server of claim 16, wherein the program instructions further comprise identifying worst case data points proximate the decision boundary, wherein the symmetrical weighting function is based on the distance from the decision boundary for the worst case data points.

18. The computer server of claim 15, wherein the program instructions further comprise customizing the modified perturbation magnitude to individual images in the problems space.

19. The computer server of claim 15, wherein the program instructions further comprise automatically tuning the modified perturbation magnitude to individual images in the problems space.

20. The computer server of claim 15, wherein the program instructions further comprise customizing the modified perturbation magnitude for individual images based on a confidence level of the distance of individual images to the decision boundary.

* * * * *